(12) United States Patent
Ha

(10) Patent No.: US 8,892,250 B2
(45) Date of Patent: Nov. 18, 2014

(54) ROBOT AND RECOVERY METHOD THEREOF

(75) Inventor: Tae Sin Ha, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 843 days.

(21) Appl. No.: 12/588,916

(22) Filed: Nov. 2, 2009

(65) Prior Publication Data

US 2010/0152894 A1 Jun. 17, 2010

(30) Foreign Application Priority Data

Dec. 15, 2008 (KR) .......................... 10-2008-126991

(51) Int. Cl.
*G06F 19/00* (2011.01)
*B25J 9/08* (2006.01)
*B25J 9/16* (2006.01)

(52) U.S. Cl.
CPC ......... *B25J 9/08* (2013.01); *G05B 2219/40204* (2013.01); *B25J 9/1674* (2013.01); *G05B 2219/40164* (2013.01); *G05B 2219/33309* (2013.01)
USPC ................ 700/245; 318/568.11; 318/568.12; 318/568.16; 318/568.2; 318/568.24

(58) Field of Classification Search
USPC .......... 700/245; 318/568.11, 568.12, 568.16, 318/568.2, 568.24
See application file for complete search history.

(56) References Cited

U.S. PATENT DOCUMENTS

| | | | | |
|---|---|---|---|---|
| 6,122,752 | A * | 9/2000 | Farah ................................. | 714/2 |
| 6,128,555 | A * | 10/2000 | Hanson et al. ................... | 701/13 |
| 6,243,622 | B1 * | 6/2001 | Yim et al. ...................... | 700/245 |
| 6,690,994 | B1 * | 2/2004 | Smith et al. ................... | 700/218 |
| 7,000,154 | B1 * | 2/2006 | LeDuc et al. ................. | 714/47.2 |
| 7,139,629 | B2 * | 11/2006 | Fromherz et al. ............. | 700/100 |
| 7,409,584 | B2 * | 8/2008 | Denninghoff et al. ....... | 714/6.23 |
| 7,856,294 | B2 * | 12/2010 | Van Gaasbeck et al. ......... | 701/3 |
| 2007/0273504 | A1 * | 11/2007 | Tran ......................... | 340/539.12 |

FOREIGN PATENT DOCUMENTS

JP 10083134 A * 3/1998 ............. G03G 21/00

OTHER PUBLICATIONS

Zhang et al., A Novel Reconfigurable Robot for Urban Search and Rescue, 2006, International Journal of Advanced Robotic Systems, vol. 3, No. 4 (2006), ISSN 1729-8806, pp. 359-366.*
Duan et al., Fault Diagnosis and Fault Tolerant Control for Wheeled Mobile Robots under Unknown Environments: A Survey, Apr. 2005, Proceedings of the 2005 IEEE International Conference on Robotics and Automation, Barcelona, Spain, pp. 3428-3433.*
Zhang et al., Locomotion Capabilities of a Novel Reconfigurable Robot with 3 DOF Active Joints for Rugged Terrain, Oct. 2006, Proceedings of the 2006 IEEE/RSJ International Conference on Intelligent Robots and Systems, Oct. 9-15, 2006, Beijing, China, pp. 5588-5593.*

(Continued)

*Primary Examiner* — Dalena Tran
*Assistant Examiner* — Jaime Figueroa
(74) *Attorney, Agent, or Firm* — Staas & Halsey LLP

(57) ABSTRACT

Disclosed herein are a robot capable of recovering from a failure of one of a plurality of symmetrically structured modules, and a recovery method thereof. When a hardware or software failure occurs, the robot recovers by itself by replacing the failed module with another corresponding module. Accordingly, resources of the robot can be more efficiently utilized.

14 Claims, 6 Drawing Sheets

(56) References Cited

OTHER PUBLICATIONS

Murata et al., M-TRAN: Self-Reconfigurable Modular Robotic System, 2002, IEEE/ASME Transactions on Mechatronics, vol. 7, No. 4, Dec. 2002, pp. 431-441.*

Tomita et al., Self-assembly and self-repair method for homogeneous distributed mechanical system, 1999, IEEE Transactions on Robotics and Automation, vol. 15, No. 6, Dec. 1999, pp. 1035-1045.*

Yoshida et al., An experimental study on a self-repairing modular machine, 1999, Elsevier, Robotics and Autonomous Systems, vol. 29, 1999, pp. 79-89.*

Yim et al., Modular self-reconfigurable robotic systems—Challenges and Opportunities for the Future, Mar. 2007, IEEE Robotics & Automation Magazine, pp. 43-52.*

* cited by examiner

ROBOT AND RECOVERY METHOD THEREOF

CROSS-REFERENCE TO RELATED APPLICATIONS

This application claims the benefit of Korean Patent Application No. 2008-0126991, filed on Dec. 15, 2008 in the Korean Intellectual Property Office, the disclosure of which is incorporated herein by reference.

BACKGROUND

1. Field

The present invention relates to a robot and a recovery method thereof, and more particularly, to a robot capable of recovering when failure occurs, and a recovery method thereof.

2. Description of the Related Art

Generally, a robot, as a device capable of automatically performing certain jobs or operations, has been utilized in various fields to replace and assist human beings.

Such robots can be classified into a robot performing jobs continuously without a dedicated manager, a robot working in an environment wherein remote control and management are unavailable, and a robot requiring continuous maintenance and management due to its working environment, which inevitably causes certain problems. If a failure occurs, however, these independent robots cannot recover rapidly and efficiently.

SUMMARY

Therefore, it is an aspect of the present invention to provide a robot capable of automatically recovering when a failure occurs in the hardware or the software thereof, and a corresponding recovery method thereof.

It is another aspect of the present invention to provide a robot capable of preventing waste of resources in recovering from the hardware or software failure, and a recovery method thereof.

Additional aspects and/or advantages of the invention will be set forth in part in the description which follows and, in part, will be apparent from the description, or may be learned by practice of the invention.

The foregoing and/or other aspects of the present invention may be achieved by providing a robot including a plurality of modules substantially symmetrically structured; and a recovery unit recovering a failure generated in any of the plurality of modules by another module symmetrically corresponding to the failed module.

The recovery unit may include a hardware recovery unit that replaces the failed module with a new module or another module already in the robot.

The hardware recovery unit may include a failure diagnosis unit diagnosing a failure according to signals supplied from sensors; a recovery determination unit determining whether the failure can be recovered; and a recovery performance unit performing operations to recover from the failure.

The hardware recovery unit may further include a danger treatment unit notifying of a danger state of the robot.

The recovery unit may include a software recovery unit that recovers from a failure by initializing a software module.

The foregoing and/or other aspects of the present invention may be achieved by providing a robot including a plurality of component parts; and a recovery unit separating a failed one of the component parts and replacing the separated part with a new part.

The recovery unit may separate the failed part and replace the separated part with another part already in the robot.

The foregoing and/or other aspects of the present invention may be achieved by providing a method to recover a robot, including diagnosing a failure of one of a plurality of modules substantially symmetrically structured; and replacing the failed module using a symmetric corresponding module.

The failure diagnosis may be performed according to signals supplied from sensors. The recovery operation may be performed by separating the failed module and replacing the separated module with a new module. The recovery operation may be performed by separating the failed module and replacing the separated module with another module already in the robot.

The failure diagnosis may be performed through mutual communication between the symmetrically structured software modules. The recovery operation may be performed by initializing the failed software module using another software module corresponding to the failed software module. Replacement of the hardware may be requested when the failure is not recovered through the initialization.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
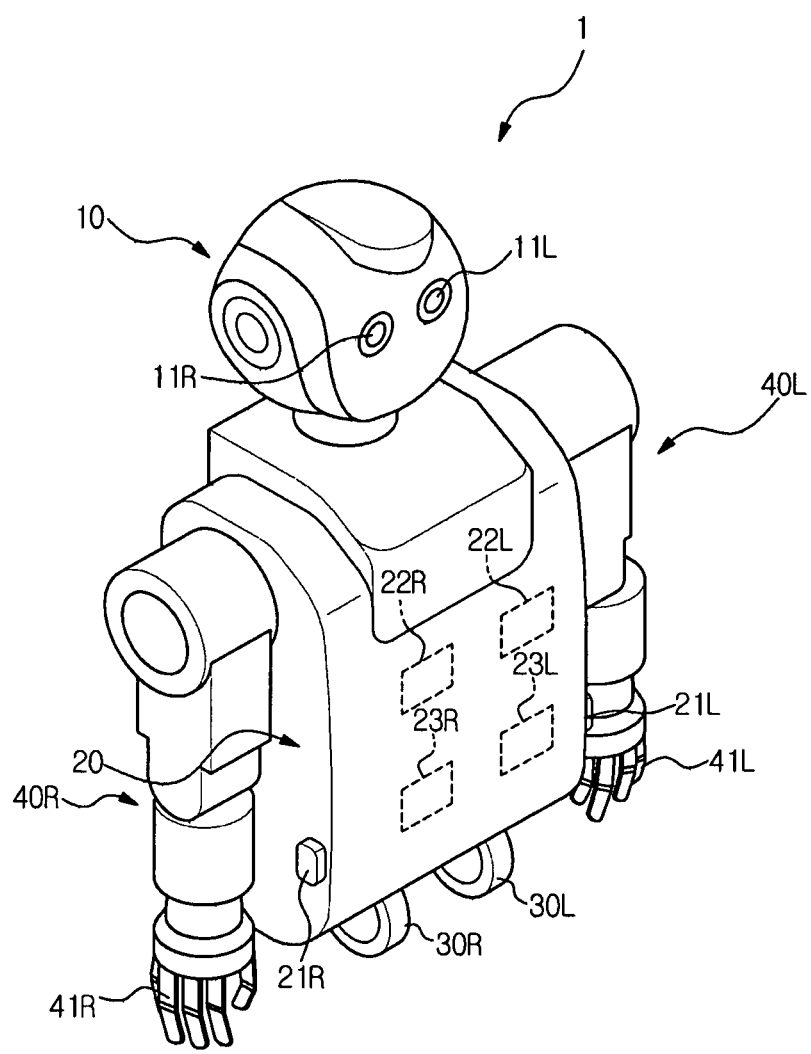
FIG. 1 is a perspective view of a robot according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a perspective view of a robot according to an embodiment of the present invention.

Referring to the drawing, the robot 1 includes a head 10, a body 20, wheels 30R and 30L formed respectively on both sides, and both arms 40R and 40L formed respectively on both sides. Here, the symbols R and L attached to the reference numerals denote right and left, respectively.

The head 10 includes cameras 11R and 11L mounted to both sides to photograph the surroundings of the robot.

On the outside of the body 20, sensors 21R and 21L are provided on both sides to help the robot travel more stably. On the inside of the body 20, batteries 22R and 22L to supply power to the component parts and main boards 23R and 23L mounted with electric parts are provided.

The arms 40R and 40L are connected with both hands 41R and 41L, respectively.

Thus, the robot 1 has a symmetric structure. In other words, one side and the other side of the robot 1 are structured corresponding to each other and therefore can substitute for each other as necessary. For this, the parts of the robot 1 are modularized. This modularity applies not only to the hardware, but also the software.

Figure 2:
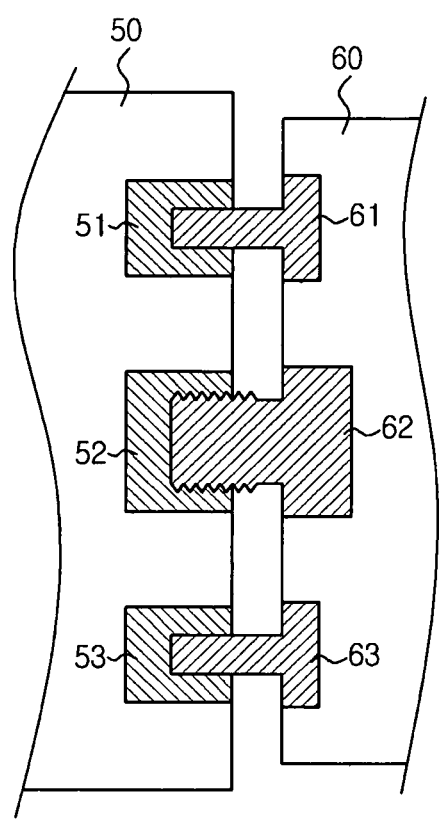
FIG. 2 is a view schematically showing the connection structure of component parts of the robot of FIG. 1.

The robot 1 according to the embodiment has a connection structure. Referring to FIG. 2, more particularly, a first part 50 and a second part 60 are detachably connected. First to third connection units 61, 62 and 63 of the second part 60 are engaged with first to third receiving units 51, 52 and 53 of the first part 50, respectively. The first and third receiving units 51 and 53 and the first and third connection units 61 and 63 may include a solenoid coil and a flange that can be connected and disconnected according to electric signals. Meanwhile, the second receiving unit 52 and the second connection unit 62 are screw-connected with each other. When a failure occurs in the second part 60, electric signals are output to command disconnection of the first and third connection units 61 and 63 from the first and third receiving units 51 and 53. In the disconnected state, the second part 60 is rotated to thereby be separated from the first part 50. Here, the separation can be achieved using at least one of the both hands 41R and 41L.

Figure 3A:
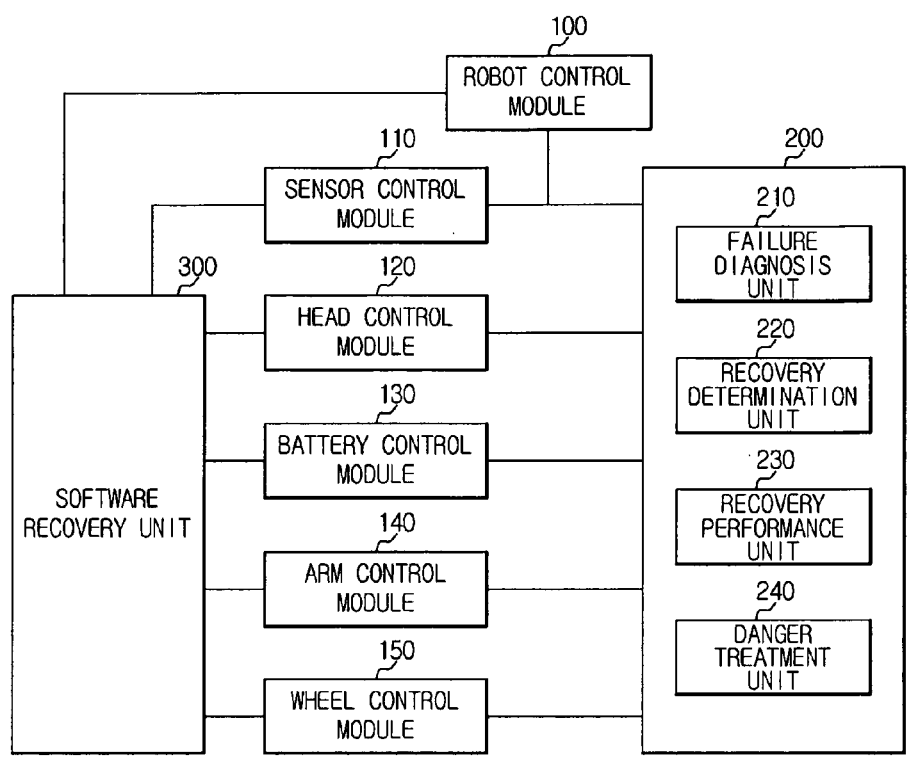
FIG. 3A is a control block diagram of the robot according to the embodiment of the present invention.
Figure 3B:
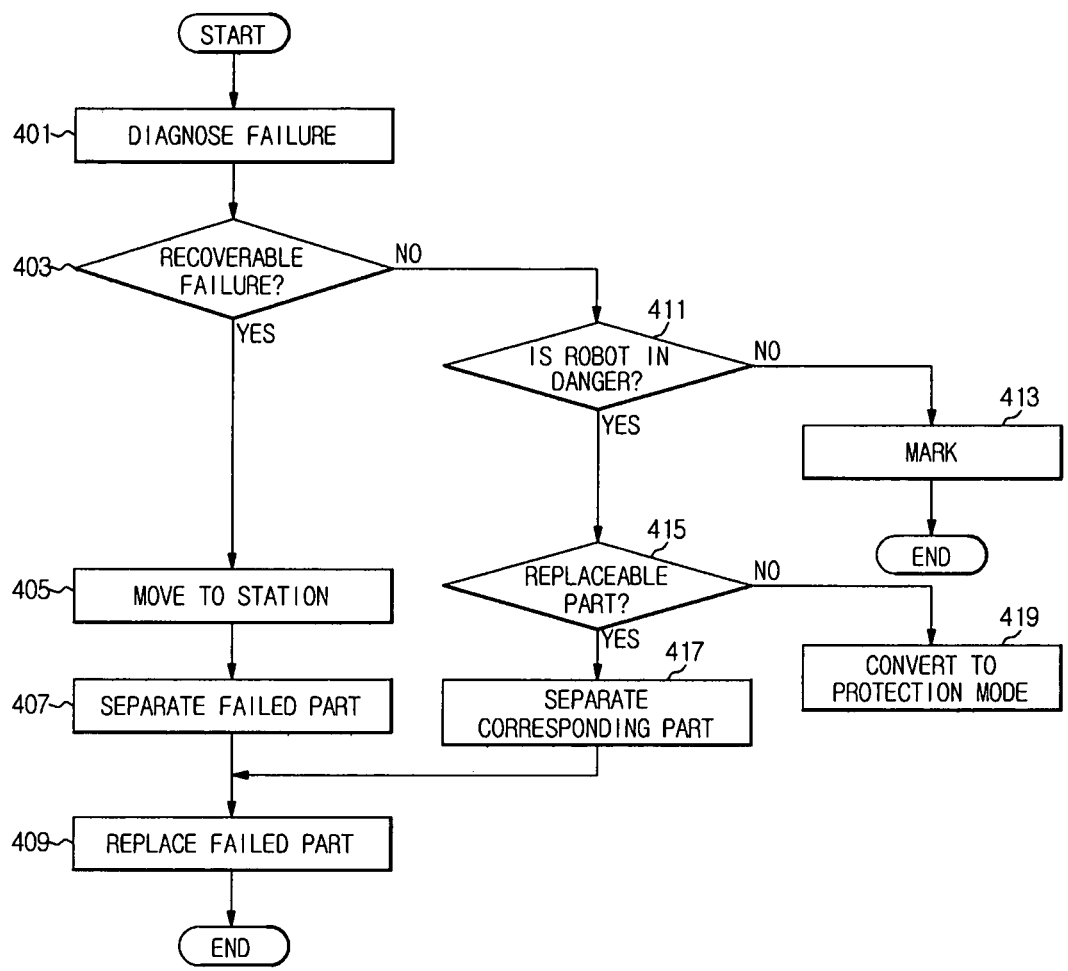
FIG. 3B is a flowchart illustrating a method for the robot to recover from a failure generated in the hardware thereof.

FIG. 3A is a control block diagram of the robot according to the embodiment of the present invention and FIG. 3B is a flowchart illustrating a method for the robot to recover from a failure generated in its hardware.

The robot includes a robot control module 100, a sensor control module 110, a head control module 120, a battery control module 130, an arm control module 140 and a wheel control module 150. Each of the control modules includes a plurality of control units to sharingly control one side and the other side of the symmetrically structured parts of the robot.

Additionally, the robot includes a hardware recovery unit 200 to recover when a hardware failure occurs in the respective parts, and a software recovery unit 300 to recover when a software failure occurs in the parts.

More particularly, the hardware recovery unit 200 includes a failure diagnosis unit 210, a recovery determination unit 220, a recovery performance unit 230, and a danger treatment unit 240.

The failure diagnosis unit 210 diagnoses a failure of the part included in the robot according to signals supplied from various sensors which are controlled by the sensor control module 110, and transmits the diagnosis result to the recovery determination unit 220 (operation 401).

The recovery determination unit 220 analyzes the diagnosis result and determines whether the failure is recoverable (operation 403). When a recoverable failure is generated, the robot is able to recover from the failure and normally operate by replacing a failed part with a new part. In case of the recoverable failure, the recovery determination unit 220 applies a recovery command to the recovery performance unit 230 so that the recovery operation begins.

In response to the recovery command, the recovery performance unit 230 operates the wheel control module 150, thereby moving the robot to a station where the failed part can be recovered (operation 405). Next, the recovery performance unit 230 operates the arm control module 140 to separate the failed part from the robot (operation 407). Next, the separated failed part is replaced with a new part (operation 409).

If the failure is unrecoverable, it is determined whether the robot is in danger such as electric discharge of the batteries and is hard to continue the normal operation (operation 411).

If it is determined that the robot is not in danger, an unrecovered part is marked and stored (operation 413) such that the manager can check the stored information and recover the unrecovered part later.

When the robot is determined to be in danger, the recovery determination part 230 determines whether the failed part can be recovered by a substitute part (operation 415). The substitute part refers to any one of the parts already equipped as part of the robot, which temporarily enables the normal operation although being unequal to the failed part. In other words, another part of the robot different from the failed part is substitutively used as makeshift part. When the failed part can be recovered by using the substitute part, the recovery performance unit 230 operates the arm control module 140 or the wheel control module 150 to separate the failed part from the robot (operation 417). The separation can be performed using at least one of the hands 41R and 41L. Next, the failed part is replaced with the substitute part (operation 409).

If the robot is in danger and even if the substitute part is unavailable, the recovery determination unit 220 applies a danger treatment command to the danger treatment unit 240. In this situation, the danger treatment unit 240 converts the robot to a protection mode (operation 419). In the protection mode, the danger treatment unit 240 stores data currently in progress and gives the alarm to notify the danger state.

Figure 4A:
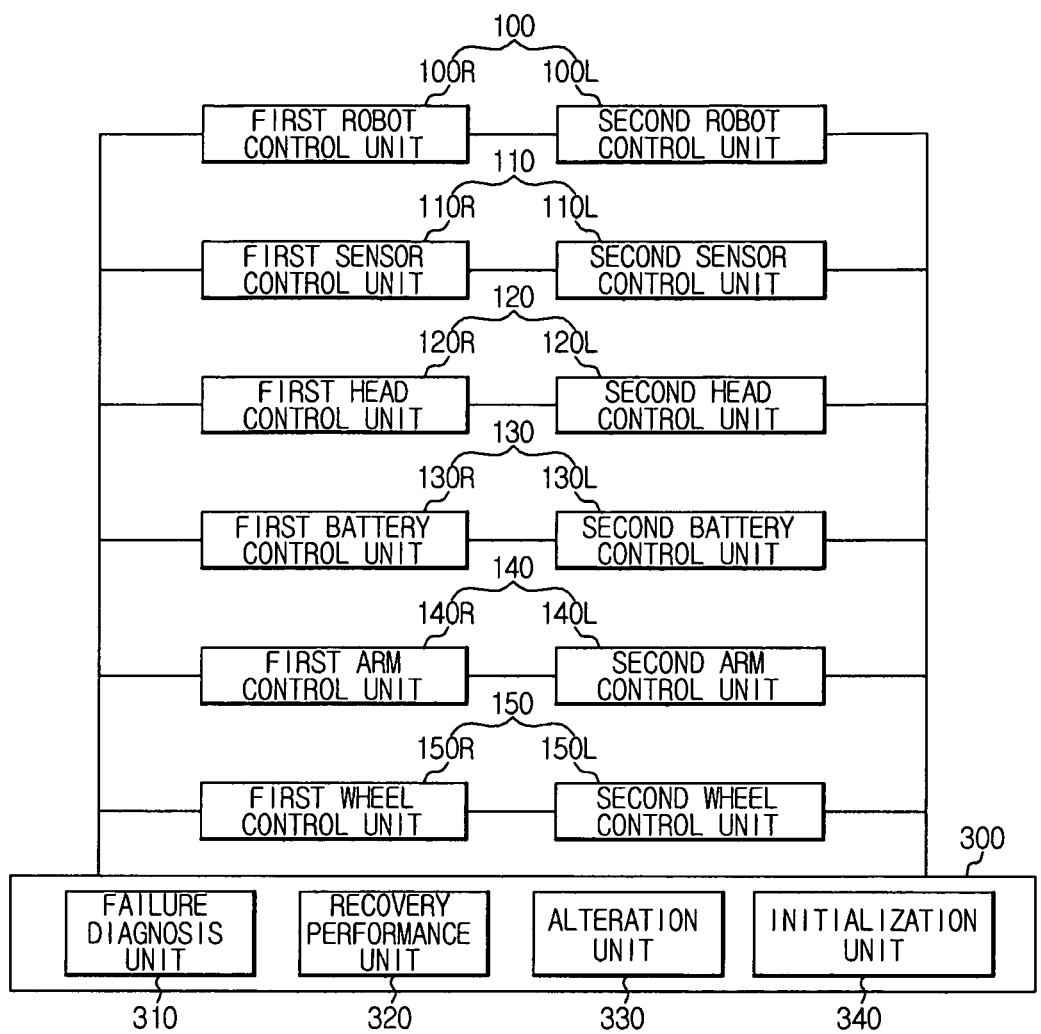
FIG. 4A is a control block diagram illustrating the operations of the robot to recover from a failure generated in the software thereof.
Figure 4B:
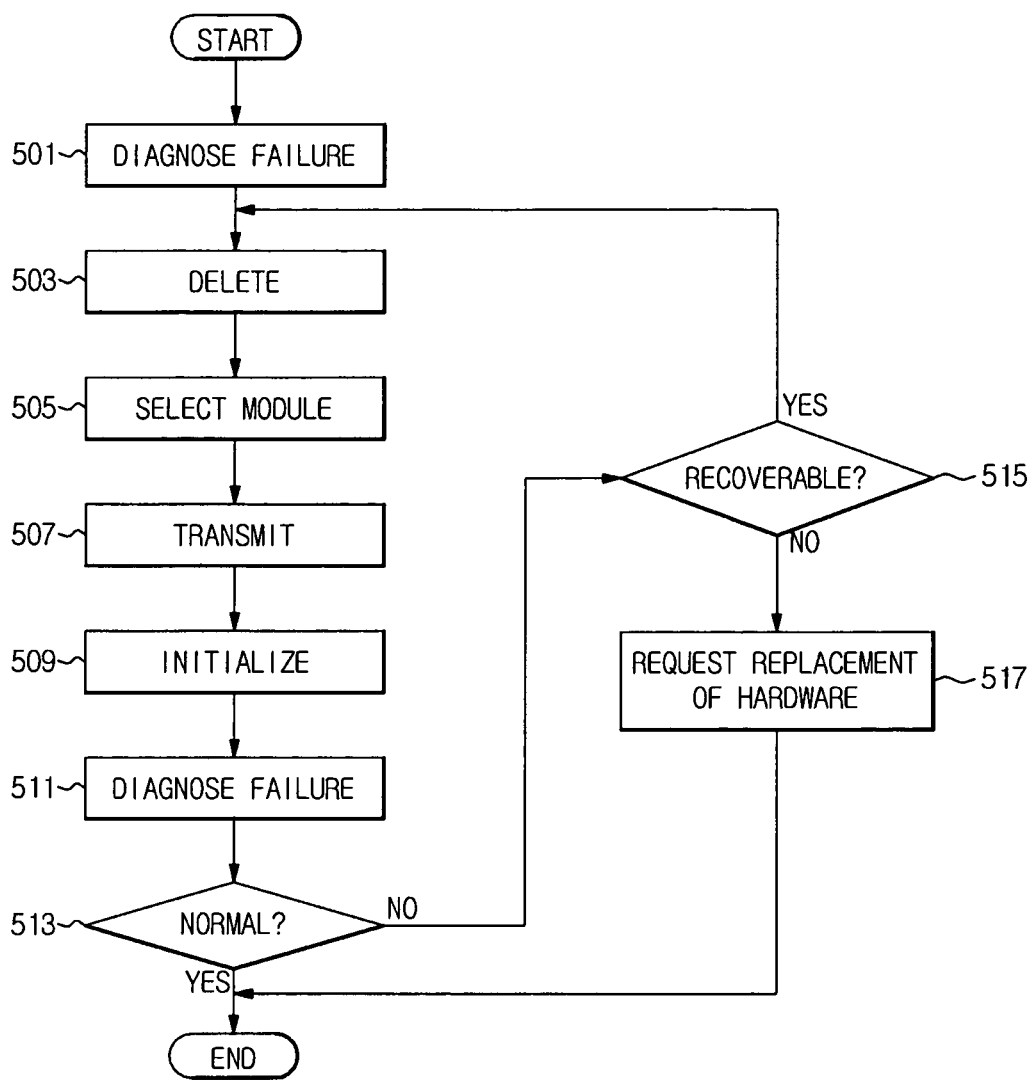
FIG. 4B is a flowchart illustrating a method for the robot to recover from a failure generated in the software thereof.

FIG. 4A is a control block diagram illustrating the operations of the robot to recover from a failure generated in its software. FIG. 4B is a flowchart illustrating a method for the robot to recover from a failure generated in the software.

As shown in the drawings, the control modules 100, 110, 120, 130, 140 and 150 include a plurality of control units to sharingly control the respective parts in charge. For this, the plurality of control units each have a software module, and the software modules are symmetrically structured to communicate with their counterpart modules and detect abnormality.

The robot control module 100 includes a first robot control unit 100R controlling the modules equipped on the right side of the robot, and a second robot control unit 100L controlling the modules equipped on the left side of the robot. The first and the second robot control units 100R and 100L each have a plurality of software modules including an operational program and a communication program.

The sensor control module 110 includes a first sensor control unit 110R controlling the right sensor 21R and a second sensor control unit 110L controlling the left sensor 21L.

The head control module 120 includes a first head control unit 120R controlling the right camera 11R and a second camera control unit 120L controlling the left camera 11L.

The battery control module 130 includes a first battery control unit 130R controlling the right battery 22R and a second battery control unit 130L controlling the left battery 22L.

The arm control module 140 includes a first arm control unit 140R controlling the right arm 40R and a second arm control unit 140L controlling the left arm 40L.

The wheel control module 150 includes a first wheel control unit 150R controlling the right wheel 30R and a second wheel control unit 150L controlling the left wheel 30L.

The plurality of control modules are connected to the software recovery unit 300. The software recovery unit 300 includes a failure diagnosis unit 310, a recovery performance unit 320, an alteration unit 330, and an initialization unit 340. Each of the control modules may include the software recovery unit 300.

In the respective control modules, software modules communicate with their counterpart modules to detect if any failure occurs in the counterpart modules (operation 501).

The failure diagnosis unit 310 recognizes occurrence of a failure in the counterpart software module. When the failure occurs at any side, it is requested to delete the software module generating the failure, and the software module is accordingly deleted (operation 503).

The recovery performance unit 320 selects a software module to recover the deleted software module (operation 505). The selected software module is stored in the alteration unit 330 in which the software module is corrected or updated. Therefore, the initialization unit 340 transmits the selected software module in the alteration unit 330, thereby initializing the software module having the failure (operations 507 and 509).

The software module having the failure and its counterpart software module communicate with each other, thereby diagnosing the failure and determining whether the robot is normally operating (operations 511 and 513). When the robot is normal, the operations are finished.

When the robot is abnormal as a result of the operation 513, it is determined whether the failure is recoverable (operation 515). The recoverable failure means a failure that can be recovered by replacing the corresponding software module.

When the failure is determined to be recoverable as a result of the operation 515, another software module is selected again as described above and the operation 503 is performed for the recovery.

When the failure is determined to be unrecoverable as a result of the operation 513, it is determined as a hardware failure caused by disabled communication or defects of the parts. Accordingly, replacement of the hardware is requested (operation 517).

As described above, a robot according to the embodiments of the present invention is capable of recovering for itself when a failure in the hardware or the software is generated using a corresponding module. Accordingly, no dedicated resources are necessitated to recover from the failure by effectively utilizing already equipped resources of the robot.

Although an embodiment of the present invention has been shown and described, it would be appreciated by those skilled in the art that changes may be made in these embodiments without departing from the principles and spirit of the invention, the scope of which is defined in the claims and their equivalents.

What is claimed is:

1. A robot comprising:
   a plurality of modules substantially symmetrically structured; and
   a recovery unit recovering from a failure generated in one module of the plurality of modules using another modules symmetrically corresponding to the failed module,
   wherein the recovery unit determines whether the failure can be recovered from and replaces the failed module with a module that is separate from the robot or one of the modules that is already included in the robot and the recovery unit stores data in progress when the recovery unit determines that the failure cannot be recovered from and the robot is not in danger.

2. The robot according to claim 1, wherein the recovery unit includes a hardware recovery unit that replaces the failed module with a module that is separate from the robot or one of the modules that is already included in the robot.

3. The robot according to claim 2, further comprising a plurality of sensors, wherein the hardware recovery unit comprises:
   a failure diagnosis unit diagnosing a failure according to signals supplied from the sensors;
   a recovery determination unit determining whether the failure can be recovered from; and
   a recovery performance unit performing operations to recover from the failure.

4. The robot according to claim 3, wherein the hardware recovery unit further comprises a danger treatment unit notifying of a danger state of the robot and storing the data in progress at a time of the notifying.

5. The robot according to claim 1, wherein the modules include a software module and the recovery unit includes a software recovery unit that recovers from the failure by initializing the software module.

6. A robot comprising:
   a plurality of component parts; and
   a recovery unit determining whether a failure can be recovered from, separating a failed one of the component parts and replacing the separated part with a new part with a module that is separate from the robot or one of the modules that is already included in the robot and storing data in progress when the recovery unit determines that the failure cannot be recovered from and the robot is not in danger.

7. The robot according to claim 6, wherein the recovery unit separates the failed part and replaces the separated part with another one of the component parts.

8. A method to recover a robot, comprising:
   diagnosing a failure of one of a plurality of modules substantially symmetrically structured;
   determining whether the failure can be recovered from;
   replacing the failed module with a module that is separate from the robot or one of the modules that is already included in the robot using a symmetric corresponding module; and
   storing data in progress when it is determined that the failure cannot be recovered from and the robot is not in danger.

9. The method according to claim 8, further comprising sensing the failure with sensors and generating a failure signal, and wherein the diagnosing the failure comprises diagnosing according to the failure signal.

10. The method according to claim 8, wherein the recovering comprises separating the failed module and replacing the separated module with a new module.

11. The method according to claim 8, wherein the recovering comprises separating the failed module and replacing the separated module with another one of the plurality of modules.

12. The method according to claim 8, wherein the diagnosing the failure comprises communicating between the symmetrically structured software modules.

13. The method according to claim 11, wherein the recovering comprises initializing the failed software module using another software module corresponding to the failed software module.

14. The method according to claim 13, further comprising replacing the hardware when the failure is not recovered through the initialization.

* * * * *